Inventors:
Ralph J. Bondley;
William H. Teare,
by Paul A. Frank
Their Attorney.

United States Patent Office 2,792,241
Patented May 14, 1957

2,792,241
REMOVABLE SEAL AND MECHANICAL JOINT

Ralph J. Bondley, Scotia, and William H. Teare, Ballston Lake, N. Y., assignors to General Electric Company, a corporation of New York Application January 14, 1954, Serial No. 404,016

3 Claims. (Cl. 285—286)

The present invention relates to a removable seal for hermetically sealing a joint between two tubular members.

The construction of high frequency apparatus frequently involves the assembly of many hollow pipe waveguide sections with hermetically tight joints between the sections. Since waveguides are generally constructed of heavy copper or copper alloy members, relatively large amounts of heat are required to braze or weld them together. It is often necessary to remove sections of the waveguide system for replacement or repair. If the waveguide sections have been brazed together in order to achieve a hermetically tight joint, removal involves further heating which tends to distort adjacent sections and to damage other brazed joints.

It is, therefore, an object of our invention to provide a hermetically tight and easily removable seal.

Another object of our invention is to provide an easily removable seal for sealing together tubular members which may be broken and resealed without transferring large amounts of heat to the members.

A further object of our invention is to provide a hermetically tight seal for joining tubular members which is formed by welding and broken by grinding away the weld metal.

Figure 1:
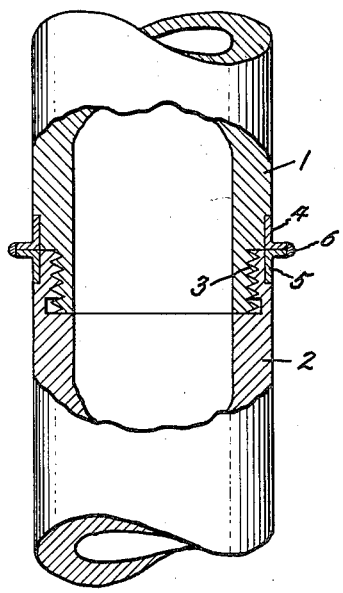
Figure 2:
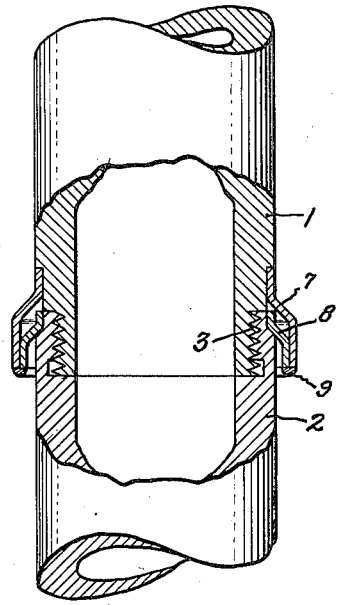

A better and more complete understanding of our invention may be had by referring to the figures of the drawing in which Figure 1 is a sectional view of a hermetic seal and Figure 2 is a sectional view of a modified form of a hermetic seal.

In accordance with our invention, a hermetically tight joint is formed by first joining the tubular members together by a mechanical means such as threading or tapered force fitting portions, attaching a thin metal flange to each of the members and sealing the peripheral edges of the flange by means of welding or brazing. The hermetic seal formed thereby may be easily broken by grinding away the weld metal at the edges of the flanges and reformed by again welding together the peripheral edges of the flanges.

As an example of an application of our invention, reference is made to Figure 1 of the drawing in which it may be assumed that the tubular members 1 and 2 are copper waveguide sections. Before the sections are assembled, annular flanges 4 and 5, of material such as ferrous alloy, are brazed to sections 1 and 2, respectively. The waveguide sections 1 and 2 may then be joined together by any satisfactory means; for example, by threads 3. The flange members are then joined by weld 6 to hermetically seal the joint between sections 1 and 2. Since the flanges are relatively thin, welding at their periphery by means of an inert arc-weld results in relatively little heat being transferred to the waveguide sections. In order to break the seal for repair or replacement of a waveguide section, the weld metal 6 at the periphery of flanges 4 and 5 is ground away and members 1 and 2 disassembled by unscrewing. The sections may be reassembled by screwing them together and welding the remaining flange portions together. A number of assembly and disassembly operations may be carried out with the same flanges.

Referring now to Figure 2, there is illustrated another form of seal in which off-set annular flanges 7 and 8 are brazed or otherwise hermetically joined to the tubular members 1 and 2 respectively and the seal is effected by electric brazing or welding the peripheral edges of the flanges together with weld 9. The flanges 7 and 8 are particularly suited to a structure which is frequently assembled and disassembled. The off-set flange is arranged to have a considerable portion thereof which may be welded and further, by being formed essentially parallel with the axis of members 1 and 2, the flanges align the sections and the spacing of the sections along the longitudinal waveguide axis is not critical. Also, there is less likelihood of damage to the flanges.

The seal of our invention can be utilized in any tubular system where an easily removable hermetic seal is desired between the sections of the system. For example, this seal is well adapted for use wherein it is desired to transfer liquids or gases at high pressure within a hollow tubular system. A seal formed in accordance with our invention has the further advantage that the members are held together by a mechanical means designed for the optimum of mechanical strength and easy assembly while the flanges form an easily broken, but hermetically tight, seal.

While our invention has been described in relation to specific embodiments, it will be understood that our invention may take various other forms without departing from the spirit or scope of our invention.

What we claim as new and desire to secure by Letters Patent of the United States is:

1. A readily removable and hermetically sealed joint for hollow members in electrical high frequency devices comprising two hollow members arranged on a common longitudinal axis with their inner surfaces in alignment and with the adjacent ends of said members being in directly abutting relationship to provide a smooth inner surface, the end portion of the first hollow member overlapping and directly mechanically joined to the end portion of the second hollow member so as to form a readily detachable rigid joint, a first and a second relatively thin flange surrounding and hermetically sealed respectively to said first and second members at their abutting ends, said flanges having adjoining portions which are hermetically heat sealed at the edge only of at least one of said flanges at a surface spaced from said members.

2. A readily removable and hermetically sealed joint for hollow members in electrical high frequency devices comprising two hollow members arranged on a common longitudinal axis with their inner surfaces in alignment and with the adjacent ends of said members being in directly abutting relationship to provide a smooth inner surface, the end portion of one member overlapping and directly mechanically joined to the end portion of the other member so as to form a readily detachable rigid joint, a first relatively thin flange surrounding and hermetically sealed to the first member at its abutting end and extending outwardly from said first member and then in a direction substantially parallel to said axis, a second relatively thin flange surrounding and hermetically sealed to the second said member at its abutting end and extending first outwardly from said second member a lesser distance than said first flange and then in a direction substantially parallel to said axis in proximity to said first flange, said first and second flanges being heat sealed along the edge surface only of at least one of said flanges.

3. A readily removable and hermetically sealed joint for substantially tubular members in electrical high frequency devices comprising a first and second substantially tubular member threadably directly connected together on a common axis so that the inner surfaces of said members are in alignment and the ends of said members are in an abutting relationship to provide a smooth inner surface, a first relatively thin annular flange surrounding and hermetically heat sealed to said first member at its abutting end and extending first outwardly from said first member and then in a direction substantially parallel to said axis, a second relatively thin annular flange surrounding and hermetically sealed to said second member at its abutting end and extending first outwardly from said second member a lesser distance than said first flange and then extending in a direction substantially parallel to said axis in proximity to said first flange, said flanges being hermetically heat sealed along the edge surface only of at least one of said flanges whereby said second flange fits within the outwardly and parallel extending portions of the first flange.

References Cited in the file of this patent

UNITED STATES PATENTS

| | | |
|---|---|---|
| 325,556 | Miles | Sept. 1, 1885 |
| 1,493,269 | Kruesi | May 6, 1924 |
| 1,792,469 | Andersson | Feb. 17, 1931 |
| 1,926,107 | Morehead | Sept. 12, 1933 |

FOREIGN PATENTS

| | | |
|---|---|---|
| 693,490 | Germany | July 10, 1940 |